(12) United States Patent
Chen

(10) Patent No.: US 9,013,556 B2
(45) Date of Patent: Apr. 21, 2015

(54) 3D IMAGE CAPTURING DEVICE FOR GENERATING A 3D IMAGE BASED ON TWO 2D IMAGES AND CONTROLLER CHIP THEREOF

(75) Inventor: Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 749 days.

(21) Appl. No.: 13/222,206

(22) Filed: Aug. 31, 2011

(65) Prior Publication Data

US 2012/0105592 A1 May 3, 2012

(30) Foreign Application Priority Data

Oct. 29, 2010 (TW) ................................ 99137153 A

(51) Int. Cl.
*H04N 13/02* (2006.01)
*H04N 13/04* (2006.01)
*G02B 27/22* (2006.01)
*H04N 1/60* (2006.01)
*H04N 9/77* (2006.01)

(52) U.S. Cl.
CPC ........ *H04N 13/0239* (2013.01); *G02B 27/2207* (2013.01); *H04N 1/6002* (2013.01); *H04N 13/0431* (2013.01); *H04N 9/77* (2013.01); *H04N 13/0257* (2013.01); *H04N 13/0296* (2013.01)

(58) Field of Classification Search
None
See application file for complete search history.

(56) References Cited

U.S. PATENT DOCUMENTS

| | | | | |
|---|---|---|---|---|
| 5,579,056 | A * | 11/1996 | Chang | 348/555 |
| 5,604,514 | A * | 2/1997 | Hancock | 345/604 |
| 6,275,234 | B1 * | 8/2001 | Iwaki | 345/428 |
| 7,558,420 | B2 | 7/2009 | Era | |
| 7,576,784 | B2 * | 8/2009 | Yen et al. | 348/222.1 |
| 8,400,493 | B2 * | 3/2013 | Porwal | 348/46 |
| 2002/0021832 | A1 * | 2/2002 | Dawson | 382/154 |
| 2004/0218269 | A1 * | 11/2004 | Divelbiss et al. | 359/464 |
| 2008/0218629 | A1 * | 9/2008 | Yang | 348/448 |
| 2008/0285852 | A1 * | 11/2008 | Chen | 382/167 |
| 2010/0245535 | A1 * | 9/2010 | Mauchly | 348/14.08 |

FOREIGN PATENT DOCUMENTS

| | | |
|---|---|---|
| CN | 1675937 | 9/2005 |
| CN | 200980140 | 11/2007 |

(Continued)

OTHER PUBLICATIONS

Chinese language office action dated Jul. 31, 2013.

(Continued)

*Primary Examiner* — Dave Czekaj
*Assistant Examiner* — Tyler W Sullivan
(74) *Attorney, Agent, or Firm* — McClure, Qualey & Rodack, LLP

(57) ABSTRACT

A 3D image capturing device and a controller chip thereof. The controller chip includes a first and a second sensor interface, a pixel data synchronization module, a 3D image generator and an output interface. The first and second sensor interfaces are coupled to a first and a second 2D image capturing device, respectively, to receive a first and a second image. The pixel data synchronization module synchronizes the pixel data of the first and second images. Based on the synchronized first and second images, the 3D image generator generates a 3D-image. By the output interface, the 3D-image capturing device transmits the generated 3D image to be received by a host.

5 Claims, 6 Drawing Sheets

(56) References Cited

FOREIGN PATENT DOCUMENTS

TW 278301 6/1996
TW M329801 4/2008

OTHER PUBLICATIONS

English language translation of abstract of CN 200980140 (published Nov. 21, 2007).

English language translation of abstract of TW 278301 (published Jun. 11, 1996).

English language translation of abstract of CN 1675937 (published Sep. 28, 2005).

English language translation of abstract of TW M329801 (published Apr. 1, 2008).

* cited by examiner

3D IMAGE CAPTURING DEVICE FOR GENERATING A 3D IMAGE BASED ON TWO 2D IMAGES AND CONTROLLER CHIP THEREOF

CROSS REFERENCE TO RELATED APPLICATIONS

This application claims priority of Taiwan Patent Application No. 099137153, filed on Oct. 29, 2010, the entirety of which is incorporated by reference herein.

BACKGROUND OF THE INVENTION

1. Field of the Invention

The present invention relates to 3D image capturing devices and controller chips thereof.

2. Description of the Related Art

The growing multimedia demand has brought 3D video into the limelight. Producing 3D images is based on the concept of binocular vision. Typically, two 2D image capturing devices are required. By combining the image captured by the first 2D image capturing device and the image captured by the second 2D image capturing device, a 3D image is generated.

FIG. 1 depicts the concept of the Red/Cyan anaglyph 3D. The images captured by a 2D image capturing device that imitates a human's left eye are termed left eye images. The images captured by a 2D image capturing device that imitates a human's right eye are termed right eye images. A 3D image (i.e. an anaglyph image) is generated by integrating red color data of a right image with green color and blue color data of a left image, where the green color and blue color data form cyan color data.

FIG. 2 depicts the concept of the side-by-side 3D. As shown, a left image and a right image are aligned side by side to form a side-by-side 3D image.

However, in comparison with a single 2D image capturing device, the apparatus for binocular vision (capturing left and right eye images) costs more than twice the amount of the single 2D image capturing device. It is an important issue to decrease the manufacturing cost of a 3D image capturing device.

BRIEF SUMMARY OF THE INVENTION 3D image capturing devices and controller chips thereof are disclosed.

A controller chip in accordance with an exemplary embodiment of the invention comprises a first sensor interface, a second sensor interface, a pixel data synchronization module, a 3D image generator and an output interface. The first sensor interface couples to a first 2D image capturing device to receive a first image. The second sensor interface couples to a second image capturing device to receive a second image. The pixel data synchronization module synchronizes the pixel data of the first and the second images. Based on the synchronized first and second images, the 3D image generator generates a 3D image. Via the output interface, the 3D image is transmitted out from the 3D image capturing device to be received by a host.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 3:
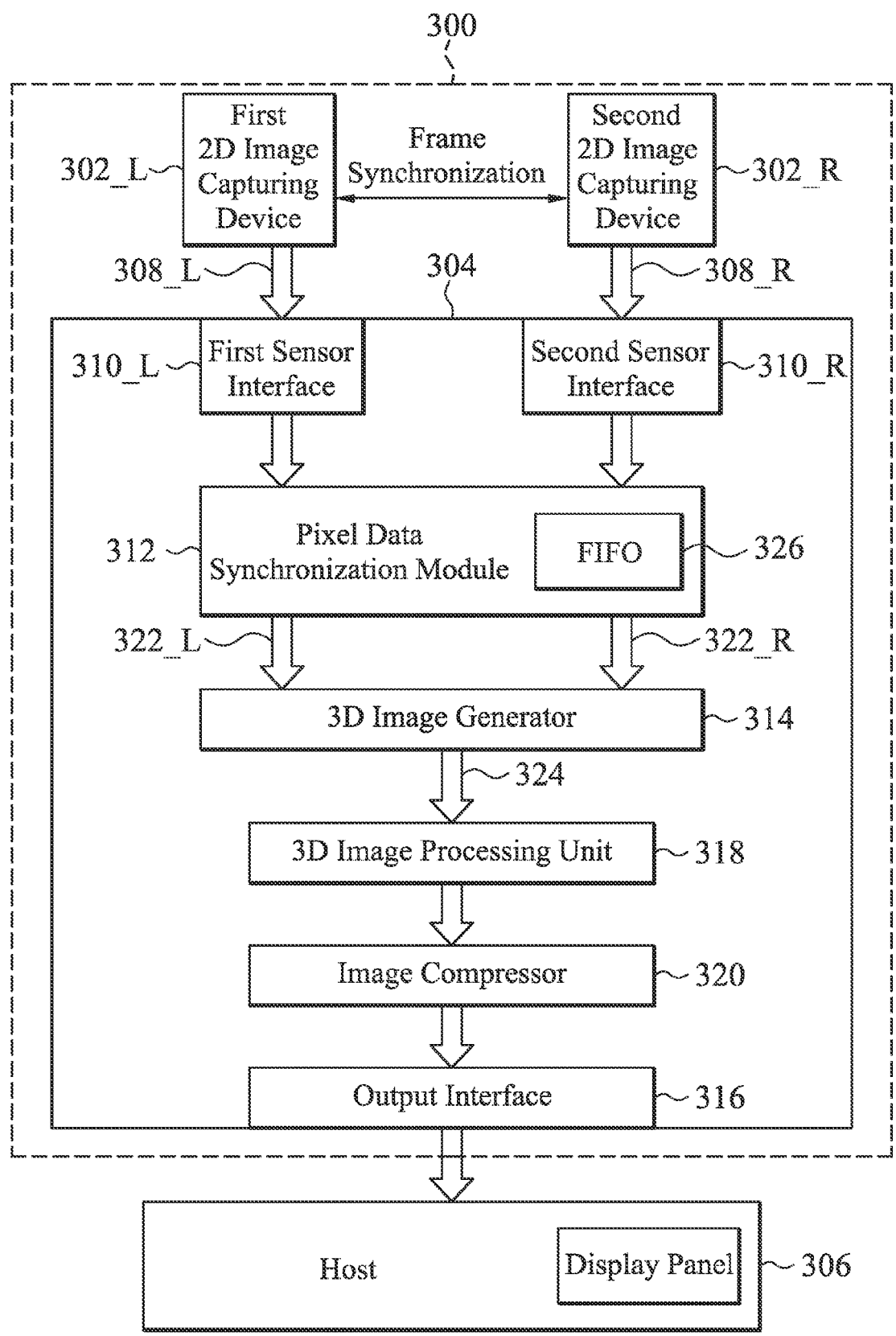
FIG. 3 depicts a 3D image capturing device in accordance with an exemplary embodiment of the invention.

FIG. 3 depicts a 3D image capturing device 300 in accordance with an exemplary embodiment of the invention. The 3D image capturing device 300 comprises a first 2D image capturing device 302_L and a second 2D image capturing device 302_R and a controller chip 304. The 3D image capturing device 300 may be connected with a host 306.

The first 2D image capturing device 302_L imitates a human's left eye, to capture a first image 308_L as a left eye image. The second 2D image capturing device 302_R imitates a human's right eye, to capture a second image 308_R as a right eye image.

The elementary structure of the controller chip 304 comprises a first sensor interface 310_L, a second sensor interface 310_R, a pixel data synchronization module 312, a 3D image generator 314 and an output interface 316. In the embodiment of FIG. 3, the controller chip 304 further comprises optional components, such as a 3D image processing unit 318 or an image compressor 320, disposed between the 3D-image generator 314 and the output interface 316.

The first sensor interface 310_L couples to the first 2D image capturing device 302_L to receive the first image 308_L. The second sensor interface 310_R couples to the second 2D image capturing device 302_R to receive the second image 308_R. The first sensor interface 310_L and the second sensor interface 310_R transmit the received first and second images 308_L and 308_R to the pixel data synchronization module 312. The pixel data synchronization module 312 synchronizes pixel data of the first and second images 308_L and 308_R. The synchronized first and second images 322_L and 322_R are transmitted to the 3D image generator 314 and the 3D image generator 314 generates a 3D-image 324 accordingly.

In the embodiment of FIG. 3, the 3D image 324 is further processed by the 3D-image processing unit 318 and the image compressor 320 before being transmitted to the output interface 316. The 3D image processing unit 318 may provide a de-noise function, an image sharpening function and so on. The image compressor 320 may introduce dynamic image compression, such as Motion Joint Photographic Experts Group (MJPEG) and so on, to the 3D image 324. Note that the 3D image processing unit 318 and the image compressor 320 are optional. In some embodiments, the 3D image 324 is transmitted to the output interface 316 without being processed by the 3D image processing unit 318 and the image compressor 320.

By the output interface 316, the 3D image capturing device 300 outputs the generated 3D images to be received by the host 306. The communication between the 3D image capturing device 300 and the host 306 may be implemented by various communication techniques. For example, the output interface 316 may be a Universal Serial Bus (USB) interface, connecting the 3D image capturing device 300 to the host 306 by a USB port.

Furthermore, the pixel data synchronization module 312 may comprise a First-In-First-Out device (FIFO) 326, for a pixel synchronization procedure between the two received images. In some embodiments, a frame synchronization function may be built between the first and the second 2D image capturing devices 302_L and 302_R. With the frame synchronization between the first and second 2D image capturing devices 302_L and 302_R, a small-sized FIFO 326 is enough. Thus, the cost of the controller chip 304 is lowered.

Furthermore, because the two received images are integrated by the 3D image capturing device 300 and only the integrated result—the 3D-image—is output, only one single output interface 316 is required to communicate with the host 306. The single design of the output interface 316 considerably lowers the cost of the controller chip 304 and the 3D-image capturing device 300 since the cost of USB ports is expensive.

Different formats of the first and second 2D image capturing devices 302_L and 302_R may result in different designs of the controller chip 304.

In a case wherein the first and second images 308_L and 308_R generated by the first and the second 2D image capturing devices 302_L and 302_R are of a YUV format, the 3D image generator 314 may comprises a 3D image generating unit of an anaglyph type and the YUV format, or of a side-by-side type and the YUV format.

Based on the synchronized first and second images 322_L and 322_R, the 3D image generating unit of the anaglyph type and the YUV format generates an anaglyph type and YUV format 3D image as the 3D image 324. Based on the synchronized first and second images 322_L and 322_R, the 3D image generating unit of the side-by-side type and the YUV format generates a side-by-side type and YUV format 3D image as the 3D image 324. In the related embodiments, the 3D image processing unit 318 may comprise a YUV data pipe, which provides various image processing procedures of the YUV format. Note that in the case wherein the 3D image 324 is of the anaglyph type and the YUV format, the image processing procedures for the hue data should be disabled, to remain the 3D anaglyph features.

Figure 4:
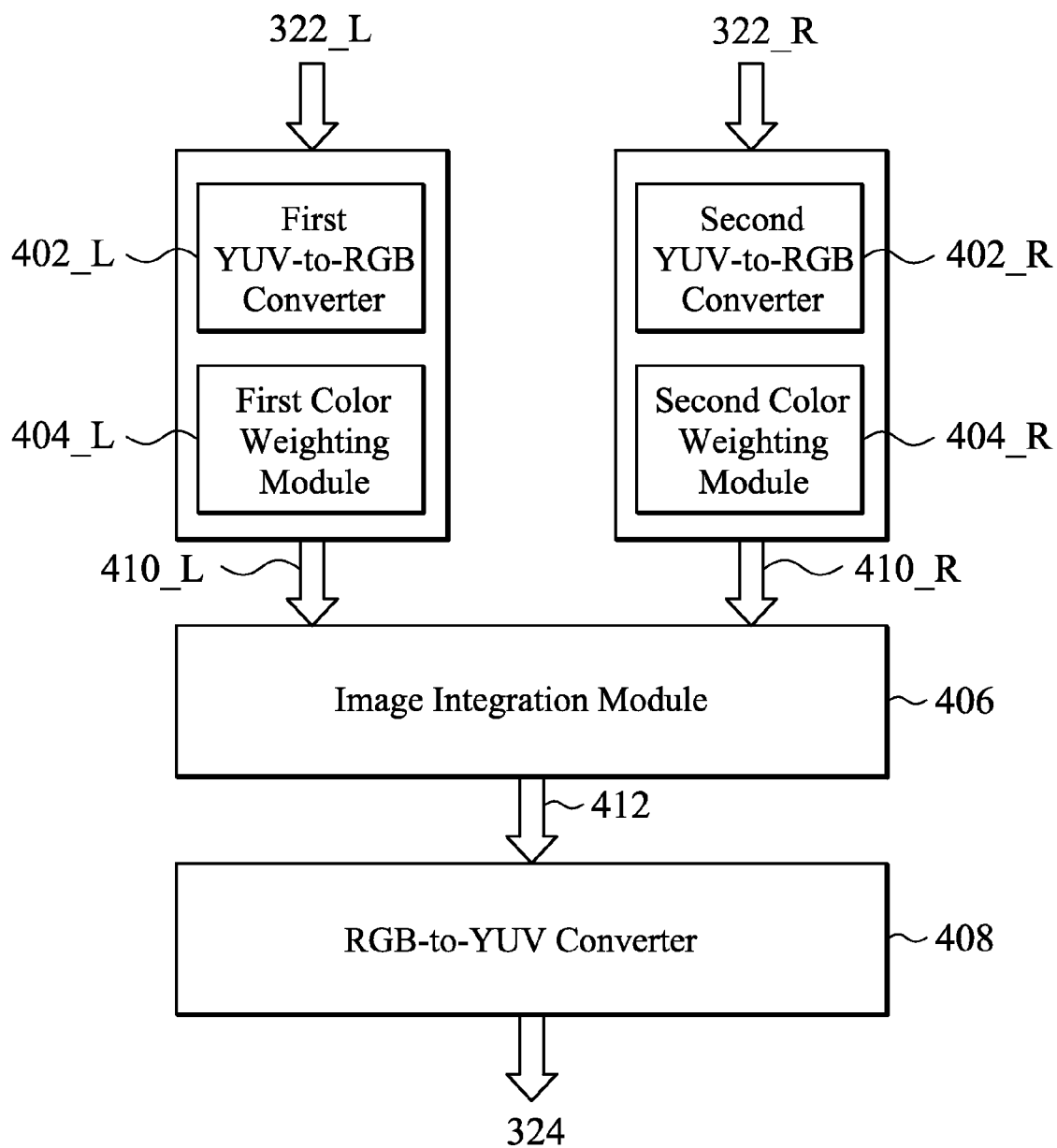
FIG. 4 illustrates an exemplary embodiment of a 3D image generator of anaglyph type and YUV format.

FIG. 4 illustrates an exemplary embodiment of the 3D image generating unit which is of the anaglyph type and the YUV format. The 3D image generating unit 400 of the anaglyph type and of the YUV format comprises a first YUV-to-RGB converter 402_L, a first color weighting module 404_L for anaglyph 3D design, a second YUV-to-RGB converter 402_R, a second color weighting module 404_R for anaglyph 3D design, an image integration module 406, and a RGB-to-YUV converter 408.

The first YUV-to-RGB converter 402_L converts the first image 322_L from the YUV format to a RGB format and then outputs the format-converted first image to the first color weighting module 404_L for determining weightings of red data ($R_L$), green data ($G_L$) and blue data ($B_L$) thereof. The second YUV-to-RGB converter 402_R converts the second image 322_R from the YUV format to the RGB format and then transmits the format-converted second image to the second color weighting module 404_R for determining the weightings of red data ($R_R$), green data ($G_R$) and blue data ($B_R$) thereof. The weighted first image is labeled as 410_L, which includes red data $W_R \cdot R_L$, green data $W_G \cdot G_L$ and blue data $W_B \cdot B_L$, where $W_R$, $W_G$ and $W_B$ are weighting values. The weighted second image is labeled as 410_R, which includes red data $(1-W_R)\cdot R_R$, green data $(1-W_G)\cdot G_R$ and blue data $(1-W_B)\cdot B_R$. The image integration module 406 receives the weighted first and second images 410_L and 410_R and integrates the weighted red, green and blue data of the two images to form an anaglyph type and RGB format 3D image 412, expressed by Equation [1], [2] and [3]:

$$R_{3D}=W_R\cdot R_L+(1-W_R)\cdot R_R; \quad \text{Equation [1]}$$

$$G_{3D}=W_G\cdot G_L+(1-W_G)\cdot G_R, \text{ and} \quad \text{Equation [2]}$$

$$B_{3D}=W_B\cdot B_L+(1-W_B)\cdot B_R, \text{ and} \quad \text{Equation [3]}$$

$R_3D$, $G_3D$, and $B_3D$ represent the red, green and blue data of the anaglyph type and RGB format 3D image 412. The anaglyph type and RGB format 3D image 412 is transmitted to the RGB-to-YUV converter 408 to be converted to the YUV format. In this manner, the anaglyph type and YUV format 3D image is generated and output as the 3D image 324.

Figure 2:
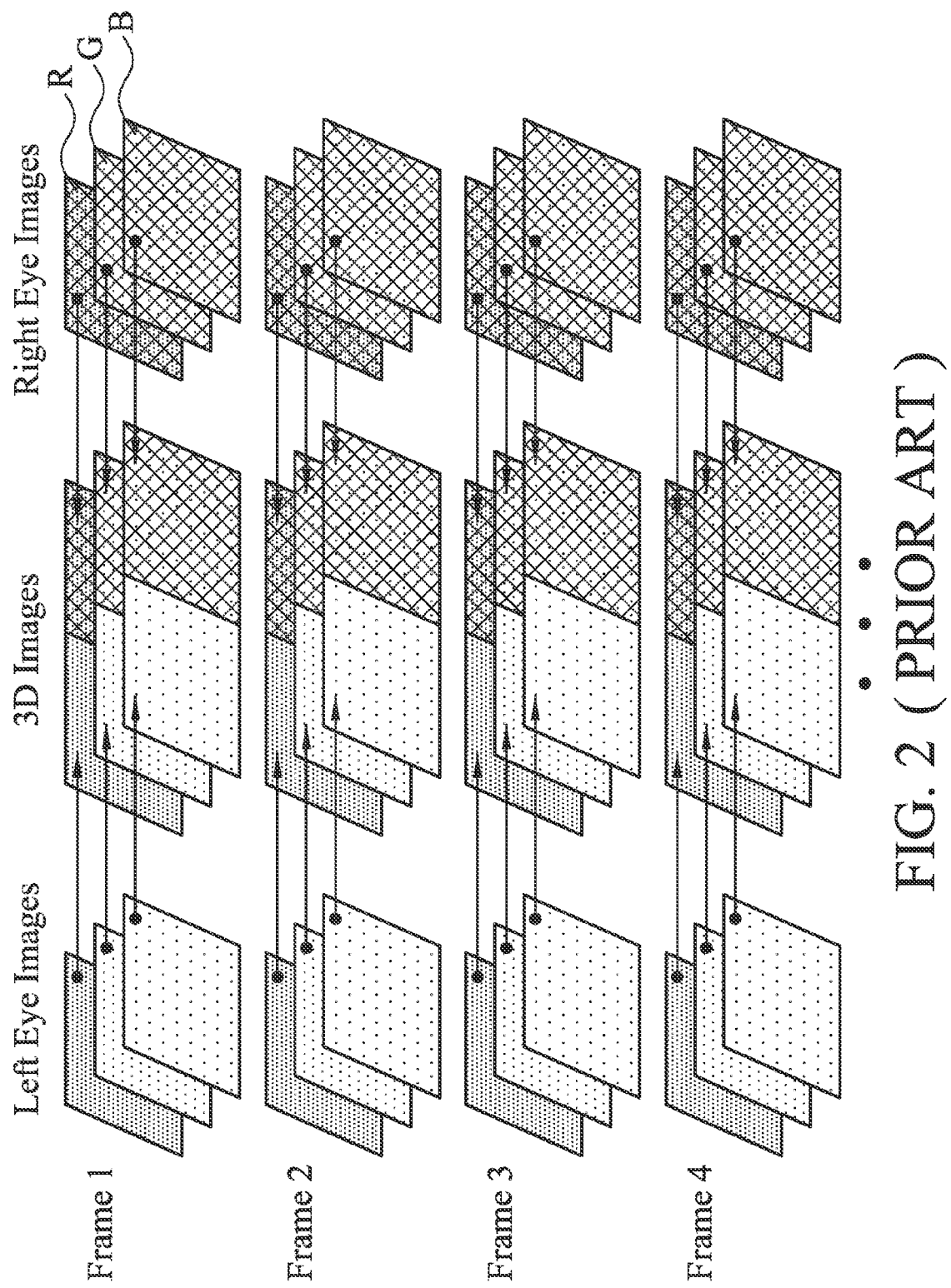
FIG. 2 the concept of the side-by-side 3D.

In another case wherein the 3D-image generator unit 314 of FIG. 3 is designed as a side-by-side type and of a YUV format, the 3D image 324 may be generated by aligning the first image 322_L (corresponding to the left eye vision) with the second image 322_R (corresponding to the right eye vision) side by side (as shown in FIG. 2). A 3D image generating unit of the side-by-side type and the YUV format may comprise a line buffer, for the side-by-side alignment of the two images.

Figure 5:
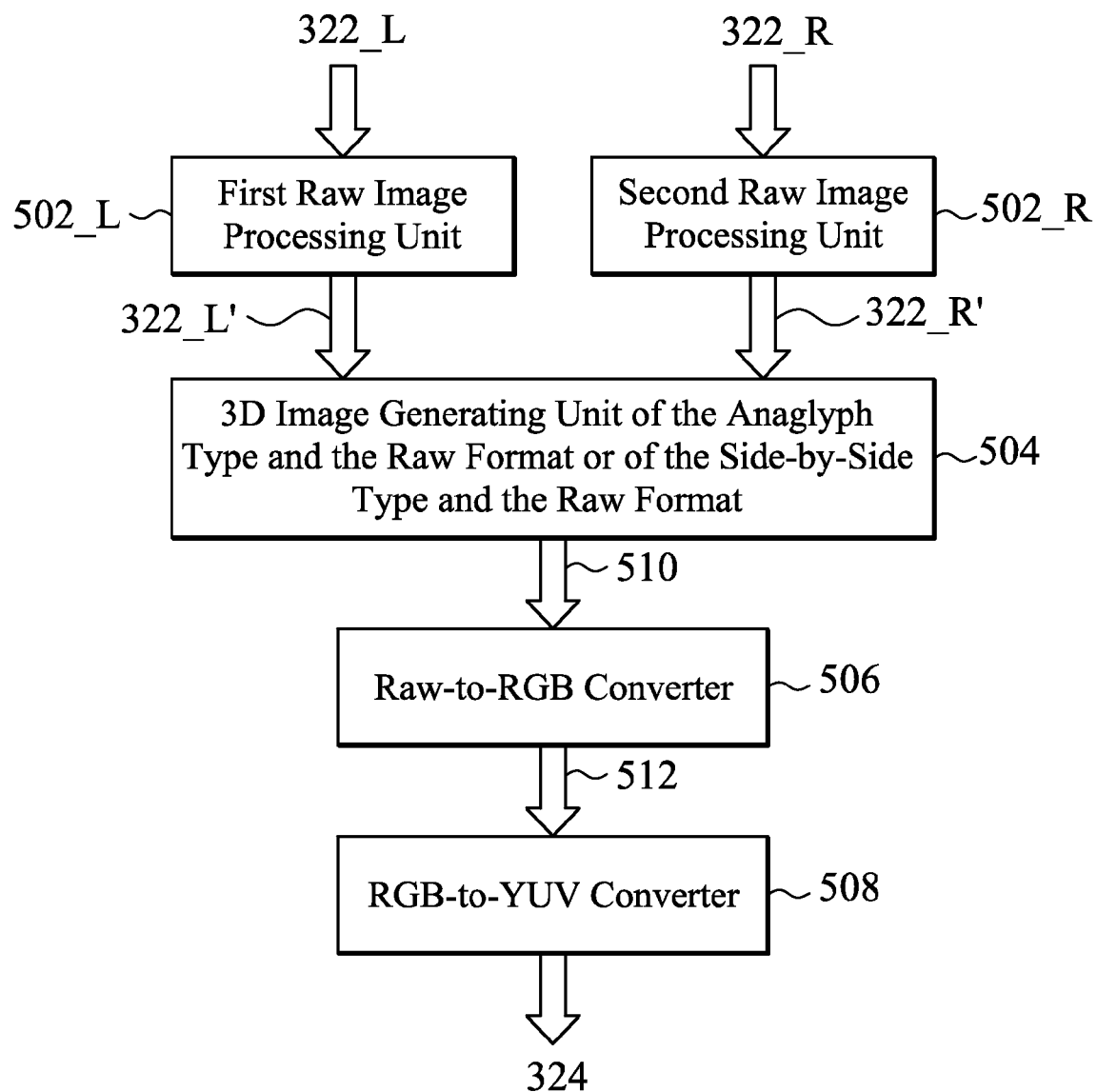
FIG. 5 illustrates an exemplary embodiment of the 3D image generator 314 of FIG. 3, corresponding to a case wherein the first and second 2D image capturing devices 302_L and 302_R are capturing raw images.

In another embodiment, the first and second 2D image capturing devices 302_L and 302_R may capture first and second images 308_L and 308_R in a raw format. FIG. 5 illustrates an exemplary embodiment of the 3D-image generator 314 of FIG. 3, which is designed for raw format images. The 3D image generator 318 comprises a first raw image processing unit 502_L and a second raw image processing unit 502_R, a module 504, a Raw-to-RGB converter 506 and a RGB-to-YUV converter 508. The module 504 may be a 3D image generating unit of the anaglyph type and the raw format, or a 3D image generating unit of the side-by-side type and the raw format.

The first and second raw image processing units 502_L and 502_R are optional. The first raw image processing unit 502_L performs image processing on the raw format first image 322_L. The second raw image processing unit 502_R performs image processing on the raw format second image 322_R. Each of the first and second raw image processing units 502_L and 502_R includes a raw data pipe, providing raw format image processing procedures, such as brightness enhancement. The first raw image processing unit 502_L outputs the processed first image 322_L' while the second raw image processing unit 502_R outputs the processed second image 322_R'. The first and second images 322_L' and 322_R' are input to the module 504, to be integrated as a raw format 3D image 510.

Figure 1:
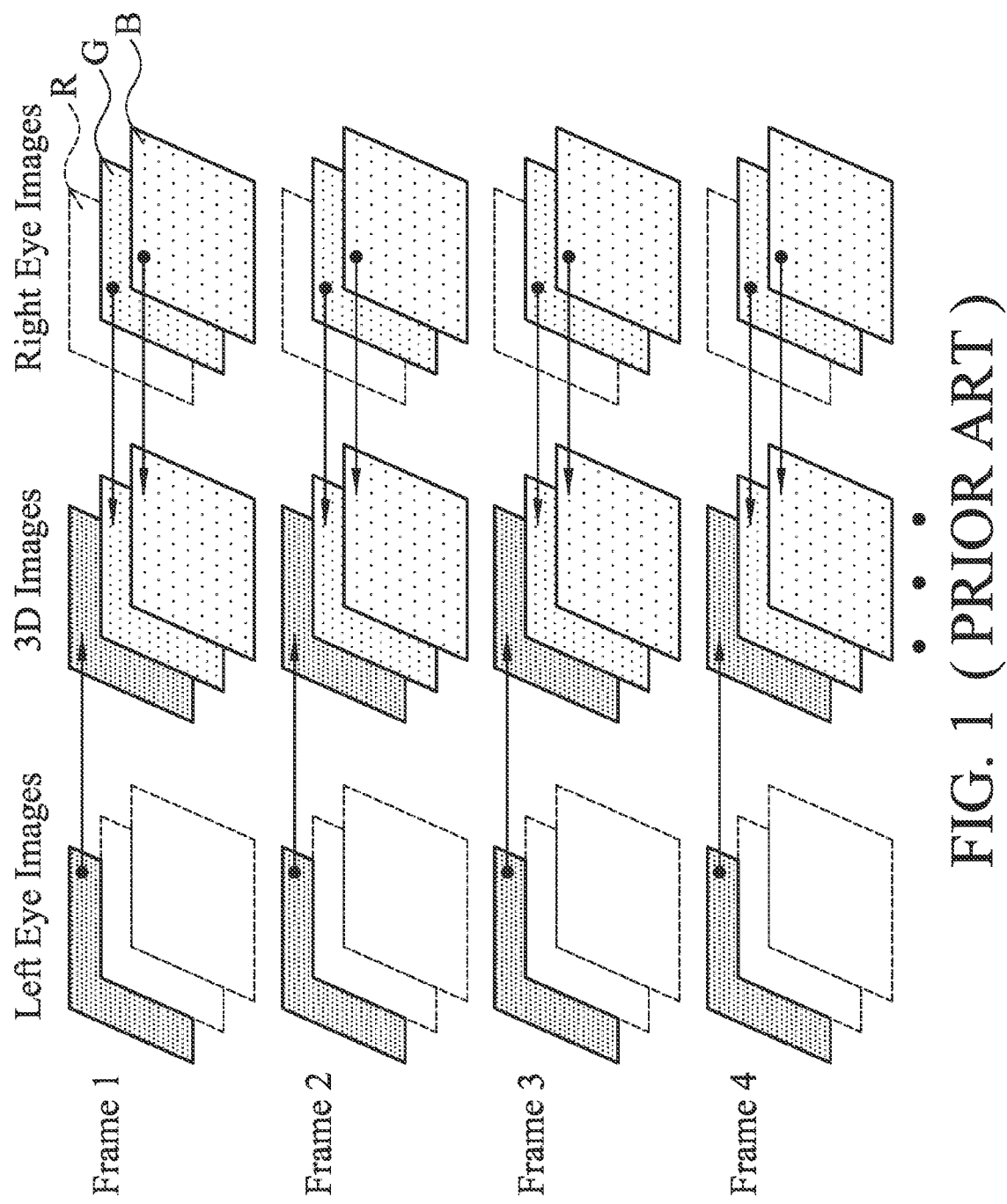
FIG. 1 depicts the concept of the Red/Cyan anaglyph 3D.

For the generation of anaglyph 3D images (illustrated in FIG. 1), the module 504 uses a 3D image generating unit of the anaglyph type and the raw format to generate an anaglyph type and raw format 3D image as the 3D image 510. The Raw-to-RGB converter 506 converts the anaglyph type and raw format 3D image 510 to an anaglyph type and RGB format 3D image 512. The RGB-to-YUV converter 508 converts the anaglyph type and RGB format 3D image 512 to the YUV format and thereby generates the 3D image 324.

For the generation of side-by-side 3D images (illustrated in FIG. 2), the module 504 uses a 3D image generating unit of the side-by-side type and the raw format to generate a side-by-side type and raw format 3D image as the 3D image 510. The Raw-to-RGB converter 506 converts the side-by-side type and raw format 3D image 510 to a side-by-side type and RGB format 3D image 512. The RGB-to-YUV converter 508 converts the side-by-side type and RGB format 3D image 512 to the YUV format and thereby generates the 3D image 324.

To cope with the YUV format 3D image 324, the 3D image processing unit (i.e. the block 318 of FIG. 3) coupled after the 3D image generator 500 may comprise a YUV data pipe, which provides image processing procedures of the YUV format. Note that in the case wherein the module 504 is a 3D image generating unit of the anaglyph type and the YUV format, the Hue data processing of the YUV data pipe has to be disabled to retain the anaglyph features.

To cope with the YUV format 3D image 324, the 3D image processing unit (i.e. the block 318 of FIG. 3) coupled after the 3D image generator 318 may comprise a YUV data pipe, which provides image processing procedures of the YUV format. Note that in the case wherein the module 504 is a 3D image generating unit of the anaglyph type and the YUV format, the Hue data processing of the YUV data pipe has to be disabled to retain the anaglyph features.

Figure 6:
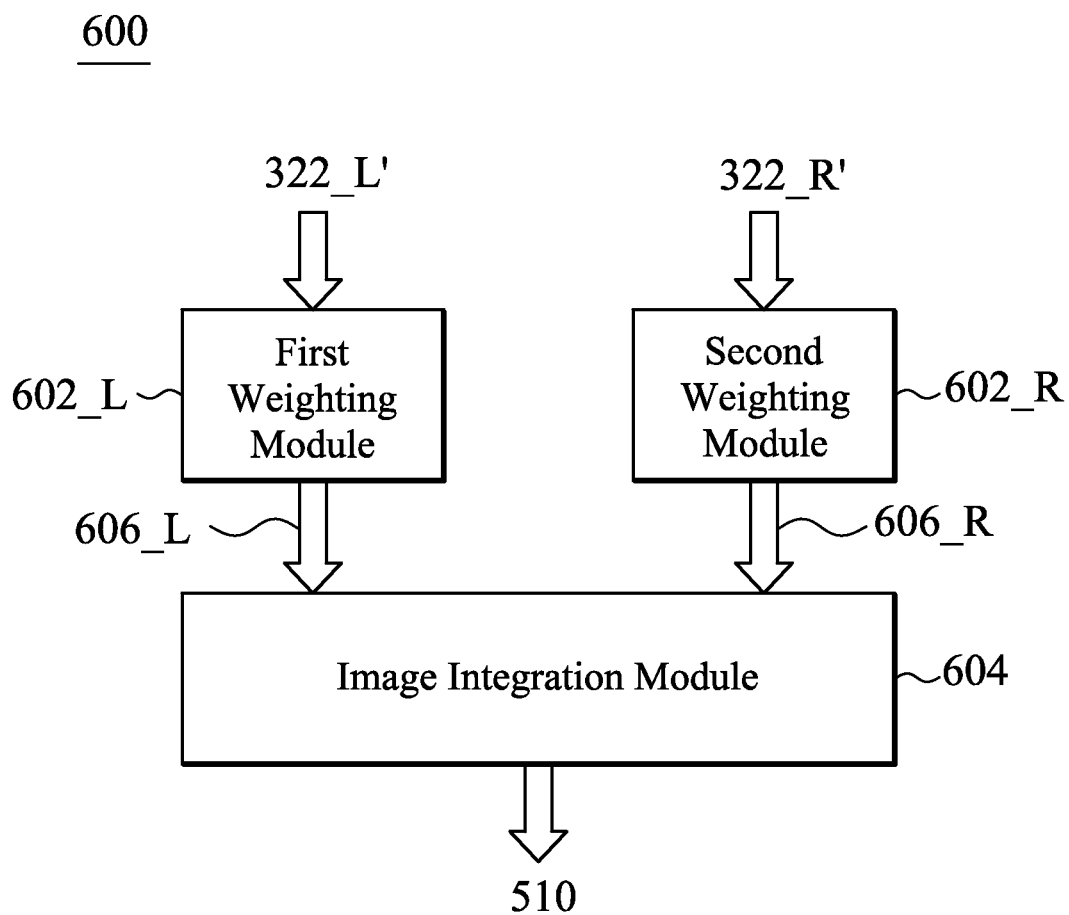
FIG. 6 illustrates an exemplary embodiment of a 3D image generating unit of anaglyph type and raw format.

FIG. 6 illustrates one embodiment of a 3D image generating unit of the anaglyph type and the raw format (one choice of the module 504). The 3D image generating unit 600 comprises a first weighting module 602_L for anaglyph 3D design, a second weighting module 602_R for anaglyph 3D design, and an image integration module 604. The first weighting module 602_R for anaglyph 3D design determines weightings of the red data ($R_L$), green data ($Gr_L$, $Gb_L$) and blue data ($B_L$) of the raw format first image 322_L'. The second weighting module 602_R for the anaglyph 3D design determines weighting of the red data ($R_R$), the green data ($Gr_R$, $Gb_R$) and the blue data ($B_R$) of the raw format second image 322_R'. The weighted first image is labeled as 606_L, containing red data $W_R \cdot R_L$, green data $W_{Gr} \cdot Gr_L$ and $W_{Gb} \cdot Gb_L$ and blue data $W_B \cdot B_L$, where $W_R$, $W_{Gr}$, $W_{Gb}$ and $W_B$ are weighting factors. The weighted second image is labeled as 606_R, containing red data $(1-W_R) \cdot R_R$, green data $(1-W_{Gr}) \cdot Gr_R$ and $(1-W_{Gb}) \cdot Gb_R$ and blue data $(1-W_B) \cdot B_R$. The image integration module 604 receives the first and second images 606_L and 606_R, and integrates the weighted red, green and blue data of the received two images and thereby generates an anaglyph type and raw format 3D image 510, wherein:

$$R_{3D} = W_R \cdot R_L + (1-W_R) \cdot R_R,$$

$$Gr_{3D} = W_{Gr} \cdot Gr_L + (1-W_{Gr}) \cdot Gr_R;$$

$$Gb_{3D} = W_{Gb} \cdot Gb_L + (1-W_{Gb}) \cdot Gb_R; \text{ and}$$

$$B_{3D} = W_B \cdot B_L + (1-W_B) \cdot B_R, \text{ and}$$

$R_{3D}$, $Gr_{3D}$ plus $Gb_{3D}$, $B_{3D}$ represent the red, green, blue data of the anaglyph type and raw format 3D image 510, respectively.

In some embodiments, the 3D-image generator 314 may contain all techniques introduced in FIGS. 4, 5 and 6. According to the data format (raw format or YUV format) of the images captured by the first and second 2D-image capturing devices 302_L and 302R, appropriate operations are performed by the components corresponding to the data format.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller chip for a 3D image capturing device, configured to
   receive a first image;
   receive a second image;
   synchronize pixel data between the first and second images;
   receive the first and second images synchronized by a pixel data synchronization module to thereby generate a 3D image; and
   transmit the 3D image to be received by a host;
   wherein the first and second images are in a YUV format; and
   the controller chip is further configured to receive the first and second images synchronized by a pixel data synchronization module to generate an anaglyph type and YUV format 3D image by: converting the first image from the YUV format to an RGB format, determining weightings of red, green and blue data of the first converted image, converting the second image received by the 3D image generating unit from the YUV format to the RGB format, determining weightings of red, green and blue data of the second converted image output, integrating the weighted red, green and blue data of the first and second images to generate an anaglyph type and RGB format 3D image, and converting the anaglyph type and RGB format 3D image to the YUV format to provide the anaglyph type and YUV format 3D image.

2. The controller chip as claimed in claim 1, further configured to:
   perform image processing on the 3D image.

3. The controller chip as claimed in claim 1, further configured to:
   compress the 3D image.

4. A 3D image capturing device, comprising:
   a controller chip for a 3D image capturing device, configured to
   receive a first image;
   receive a second image;
   synchronize pixel data between the first and second images;
   receive the first and second images synchronized by a pixel data synchronization module to thereby generate a 3D image; and
   transmit the 3D image to be received by a host;
   wherein the first and second images are in a YUV format; and
   the controller chip is further configured to receive the first and second images synchronized by a pixel data synchronization module to generate an anaglyph type and YUV format 3D image by: converting the first image from the YUV format to an RGB format, determining weightings of red, green and blue data of the first converted image, converting the second image received by the 3D image generating unit from the YUV format to the RGB format, determining weightings of red, green and blue data of the second converted image output, integrating the weighted red, green and blue data of the first and second images to generate an anaglyph type and RGB format 3D image, and converting the anaglyph type and RGB format 3D image to the YUV format to provide the anaglyph type and YUV format 3D image;
a first 2D image capturing device; and
a second 2D image capturing device.

5. The 3D-image capturing device as claimed in claim 4, wherein the first and second 2D image capturing devices are coupled to each other and a frame synchronization therebetween is enabled.

\* \* \* \* \*